US007325156B1

(12) United States Patent
Schloss et al.

(10) Patent No.: US 7,325,156 B1
(45) Date of Patent: Jan. 29, 2008

(54) METHODS AND APPARATUS FOR BACKING UP DATA IN A DATA CENTER

(75) Inventors: Rheid Schloss, Fort Collins, CO (US); Blaine Southam, Windsor, CO (US); Todd D. Reedy, Wellington, CO (US); Roy Johnson, Fort Collins, CO (US); Brian J. O'Keefe, Fort Collins, CO (US); Scot Greenidge, Loveland, CO (US); Aland B. Adams, Fort Collins, CO (US); Martin A. Casillas, Roseville, CA (US); Gerald P. Duggan, Fort Collins, CO (US); Alassane Sene, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 666 days.

(21) Appl. No.: 10/961,500

(22) Filed: Oct. 7, 2004

(51) Int. Cl.
*G06F 11/00* (2006.01)

(52) U.S. Cl. .................... 714/6; 714/41; 711/162; 709/219

(58) Field of Classification Search ............... 714/41
See application file for complete search history.

(56) References Cited

U.S. PATENT DOCUMENTS 5,924,102 A * 7/1999 Perks .................... 707/200

| | | | |
|---|---|---|---|
| 6,760,861 B2 * | 7/2004 | Fukuhara et al. | 714/4 |
| 7,085,904 B2 * | 8/2006 | Mizuno et al. | 711/162 |
| 2004/0064558 A1 * | 4/2004 | Miyake | 709/226 |
| 2004/0187012 A1 * | 9/2004 | Kohiyama et al. | 713/193 |
| 2005/0021869 A1 * | 1/2005 | Aultman et al. | 709/249 |
| 2005/0086443 A1 * | 4/2005 | Mizuno et al. | 711/162 |

OTHER PUBLICATIONS

Hewlett-Packard Development Company, L.P., "Virtualization solutions for the adaptive enterprise", Jul. 2003, 5 sheets.

* cited by examiner

*Primary Examiner*—Scott Baderman
*Assistant Examiner*—Loan Truong

(57) ABSTRACT

In one embodiment, and under control of resources belonging to a controller domain of a data center, a farm server for which a backup operation is to be performed is identified. Interfaces of backup services belonging to the controller domain are then virtually associated with the first farm network. Thereafter, the farm server and backup services are registered in a backup domain of the data center, the backup domain being associated with backup storage. Via the backup services that have been associated with the first farm network, and during execution of the backup operation by the farm server, movement of backup data from the first farm network to the backup storage is facilitated by the method. After completing the backup operation, the farm server and backup services are un-registered from the backup domain, and the interfaces of the backup services are de-associated from the first farm network.

23 Claims, 4 Drawing Sheets

METHODS AND APPARATUS FOR BACKING UP DATA IN A DATA CENTER

BACKGROUND

A data center is a collection of secure, fault-resistant resources that are accessed by users over a communications network (e.g., a wide area network (WAN) such as the Internet). By way of example only, the resources of a data center may comprise servers, storage, switches, routers, or modems. Often, data centers provide support for corporate websites and services, web hosting companies, telephony service providers, internet service providers, or application service providers.

Some data centers, such as Hewlett-Packard Company's Utility Data Center (UDC), provide for virtualization of the various resources included within a data center.

An issue that needs to be addressed within a data center is how to backup the data center, especially when the data center maintains data for multiple secure networks having different levels of security or belong to different trust domains.

One way to backup data within a data center is to perform a raw volume backup of an entire disk. While this provides a satisfactory means for restoring an entire disk, disaster recovery efforts are often of finer granularity (i.e., typically only a particular file or files needs to be recovered, or only a particular application needs to be recovered). Thus, raw volume backups often result in backing up more data than is needed, which is a waste of both data center resources and backup disks. In addition, restoring data from a raw volume backup is unnecessarily time-consuming when a user only needs to restore a subset of files.

Another way to backup data within a data center is to create a dedicated backup infrastructure for backing up disks. However, a problem with this sort of backup is that the backup infrastructure typically creates a shared network for backing up the disks, which is undesirable given that a data center disk may be shared by different secure networks that 1) are associated with different levels of security, or 2) belong to different trust domains. Creating a dedicated backup infrastructure also doubles the cost and complexity of a data center.

SUMMARY OF THE INVENTION

In one embodiment, a method comprises, under control of resources belonging to a controller domain of a data center, identifying a farm server for which a backup operation is to be performed (the farm server belonging to a first of a number of secure farm networks maintained by the data center). Interfaces of backup services belonging to the controller domain are then virtually associated with the first farm network. Next, the farm server and backup services are registered in a backup domain of the data center. The backup domain comprises backup storage. Via the backup services that have been associated with the first farm network, and during execution of the backup operation by the farm server, movement of backup data from the first farm network to the backup storage is facilitated. After completing the backup operation, the farm server and backup services are un-registered from the backup domain, and the interfaces of the backup services are de-associated from the first farm network.

In another embodiment, a management server comprises a data mover service and a backup manager service, both implemented in code stored on the management server. The management server also comprises machine executable instructions that, when executed by the management server, cause the management server to 1) associate an interface of the data mover service with only one of a number of secure farm networks maintained within a data center, and 2) independently associate an interface of the backup manager service with one or more of the number of farm networks.

Other embodiments are also disclosed.

BRIEF DESCRIPTION OF THE DRAWINGS

Illustrative and presently preferred embodiments of the invention are illustrated in the drawings, in which.

DETAILED DESCRIPTION OF AN EMBODIMENT

Figure 1:
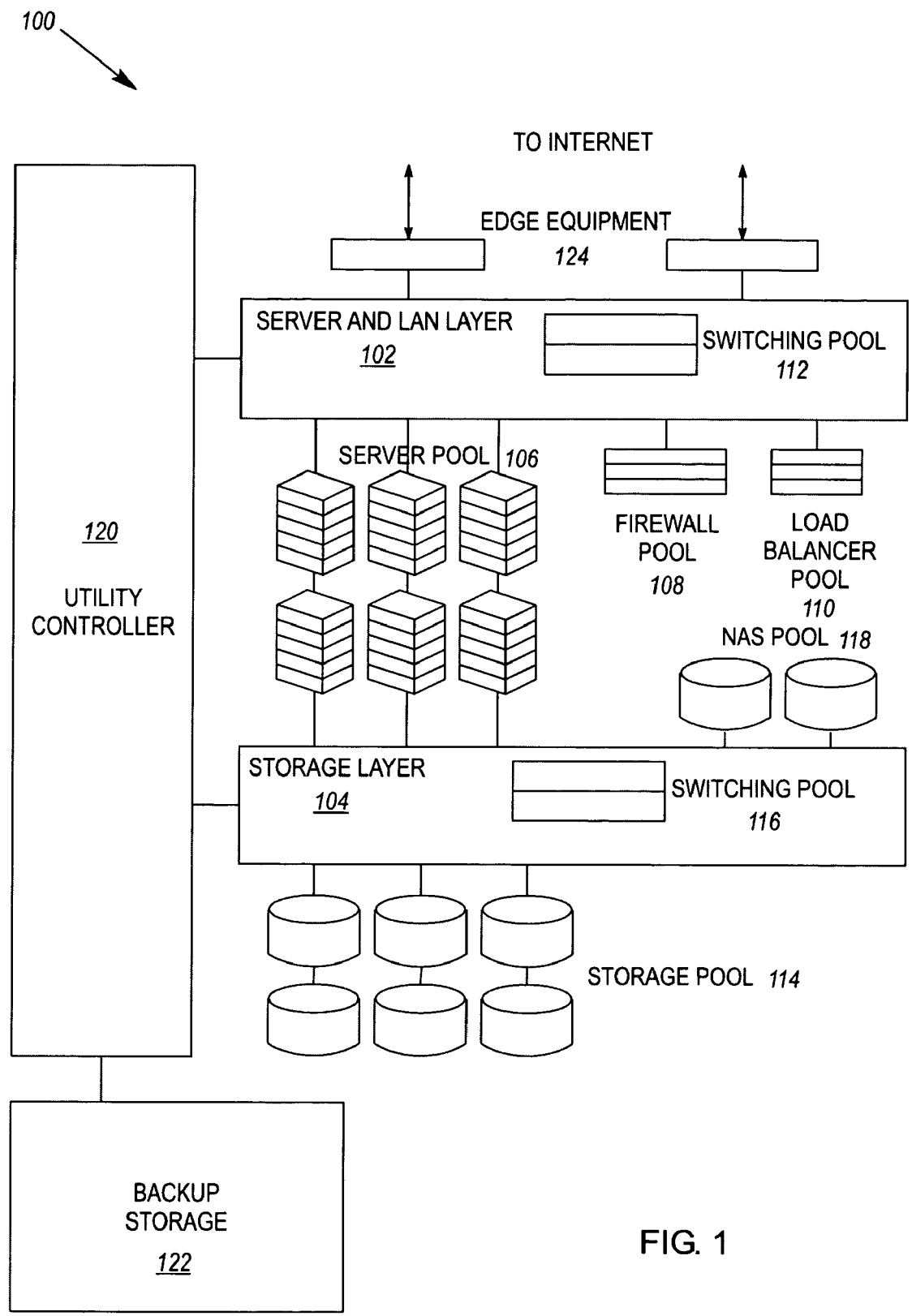
FIG. 1 illustrates an exemplary embodiment of a data center.

Portions of an exemplary data center 100 are shown in FIG. 1. The data center 100 generally comprises a virtual server and local area network (LAN) layer 102 and a virtual storage layer 104. The server and LAN layer 102 may comprise various resources, including a server pool 106, a firewall pool 108, a load balancer pool 110, a switching pool 112 and other resources (e.g., routers). The storage layer 104 may also comprise various resources, including a storage pool 114, a switching pool 116 and other resources (e.g., specific types of storage pools, such as a network area storage (NAS) pool 118 or a storage area network (SAN)).

Figure 2:
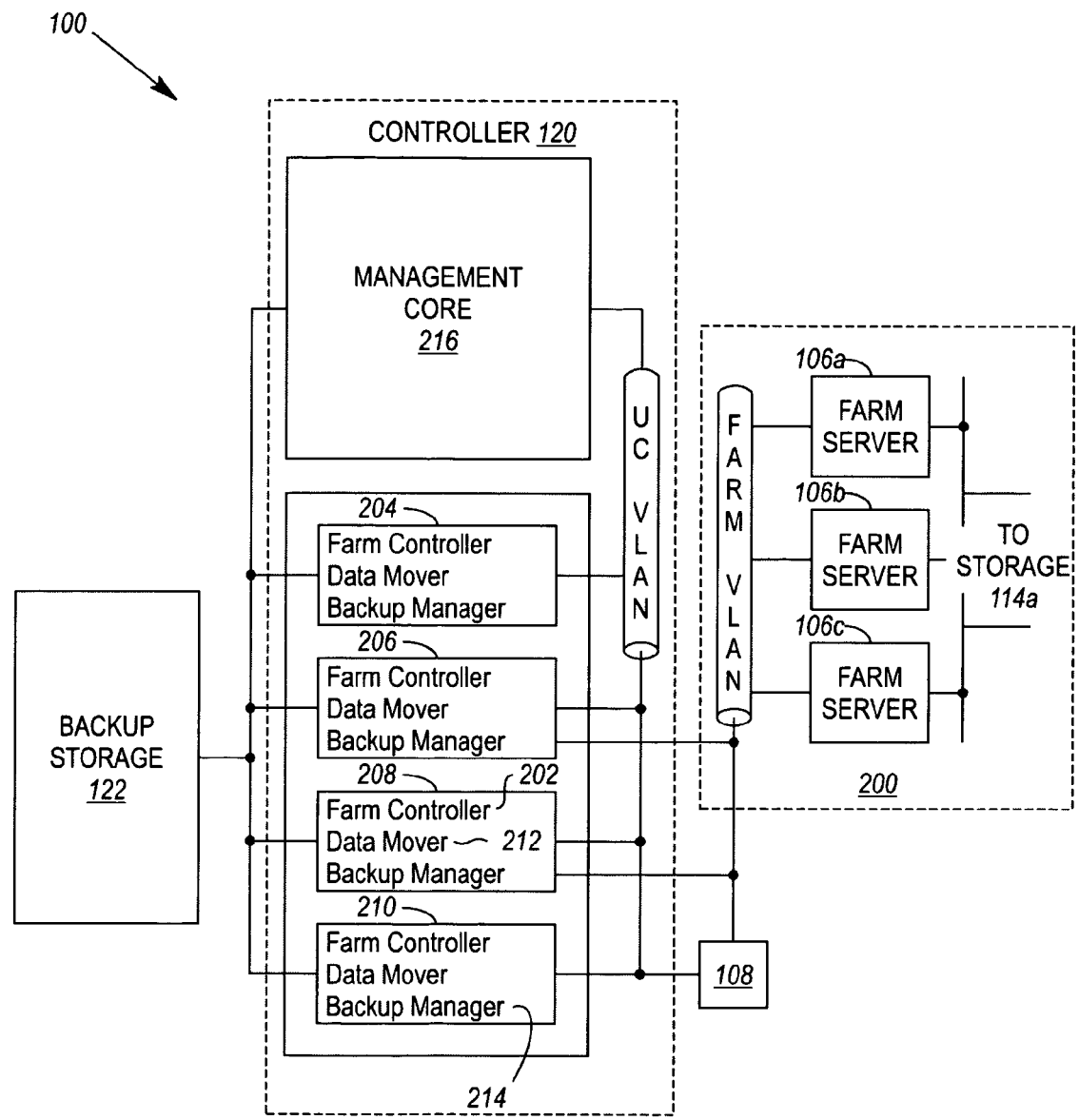
FIG. 2 provides an exemplary virtual configuration of various resources provided by the FIG. 1 data center.

The data center 100 further comprises a controller 120. As shown in FIG. 2, the controller 120 may comprise a collection of resources that, together, provide the functionality of the controller 120.

The data center 100 may also comprise backup storage 122. The backup storage 122 may take various forms, including those of a tape library or a redundant array of inexpensive disks (i.e., a RAID system).

Various types of edge equipment 124 (e.g., routers, switches and load balancers) may connect the resources of the data center 100 to a wide area network (WAN) such as the Internet.

As used herein, "virtual resources" are resources that are physically connected in one way, but capable of logical presentation in different ways. In this manner, the resources may be logically presented to users of different security and trust domains, without having to physically move or rewire the resources. It should be noted, however, that the novel backup methods and apparatus disclosed herein are not limited to use in virtualized data centers (i.e., a data center comprised of virtual resources).

FIG. 2 provides an exemplary virtual configuration of various resources provided by the FIG. 1 data center 100. As shown in FIG. 2, the controller 120 may host a plurality of farm controller services. Machine executable instructions executed by the controller 120 may then form a number of secure farm networks 200 (i.e., one or more) by associating at least one of the farm controller services 202 with at least one farm server 106*a*, 106*b*, 106*c* in the server pool 106, and at least one storage resource 114a in the storage pool 114. In a preferred embodiment, a single farm controller 202 manages each farm network 200. In FIG. 2, only a single virtual farm network 200 (FARM VLAN) is shown.

As also shown in FIG. 2, the controller 120 may host a number of backup services (e.g., 212, 214). By way of example, the backup services hosted by the controller 120 are shown to comprise data mover services and backup manager services. In one embodiment, the controller 120 comprises a pool of management servers 204, 206, 208, 210, each of which hosts farm controller and backup services. The backup services used to conduct a backup operation for a particular farm network 200 may, or may not, be located on the same management server 208 that hosts the farm controller service 202 for the farm network 200. Preferably, each management server 204-210 hosts the same or similar services (e.g., farm controller and backup services). In this manner, a degree of redundancy is provided should one or more of the management servers 204-210 fail. However, in other embodiments of the controller 120, different services may be hosted by different management servers 204-210.

The services hosted by the management servers 204-210 may be associated with a number of different domains. For example, a controller domain (possibly comprising various subnets) may associate interfaces of the farm controller and backup services with other controller resources, including other servers and software applications, and possibly a controller management core 216. In FIG. 2, components 204-210, 216) of the controller domain are coupled to one another via the UC VLAN. The UC VLAN may be coupled to the data center's various farm networks 200 (e.g., FARM VLAN) via a number of firewalls 108. In this manner, operations of the controller 120 are secured from attack by means of the data center's farm networks 200.

The services hosted by the management servers 204-210 may also be associated with a backup domain comprising backup storage 122. This backup domain may also associate the backup storage 122 with other controller resources (e.g., the controller management core 212).

Figure 3:
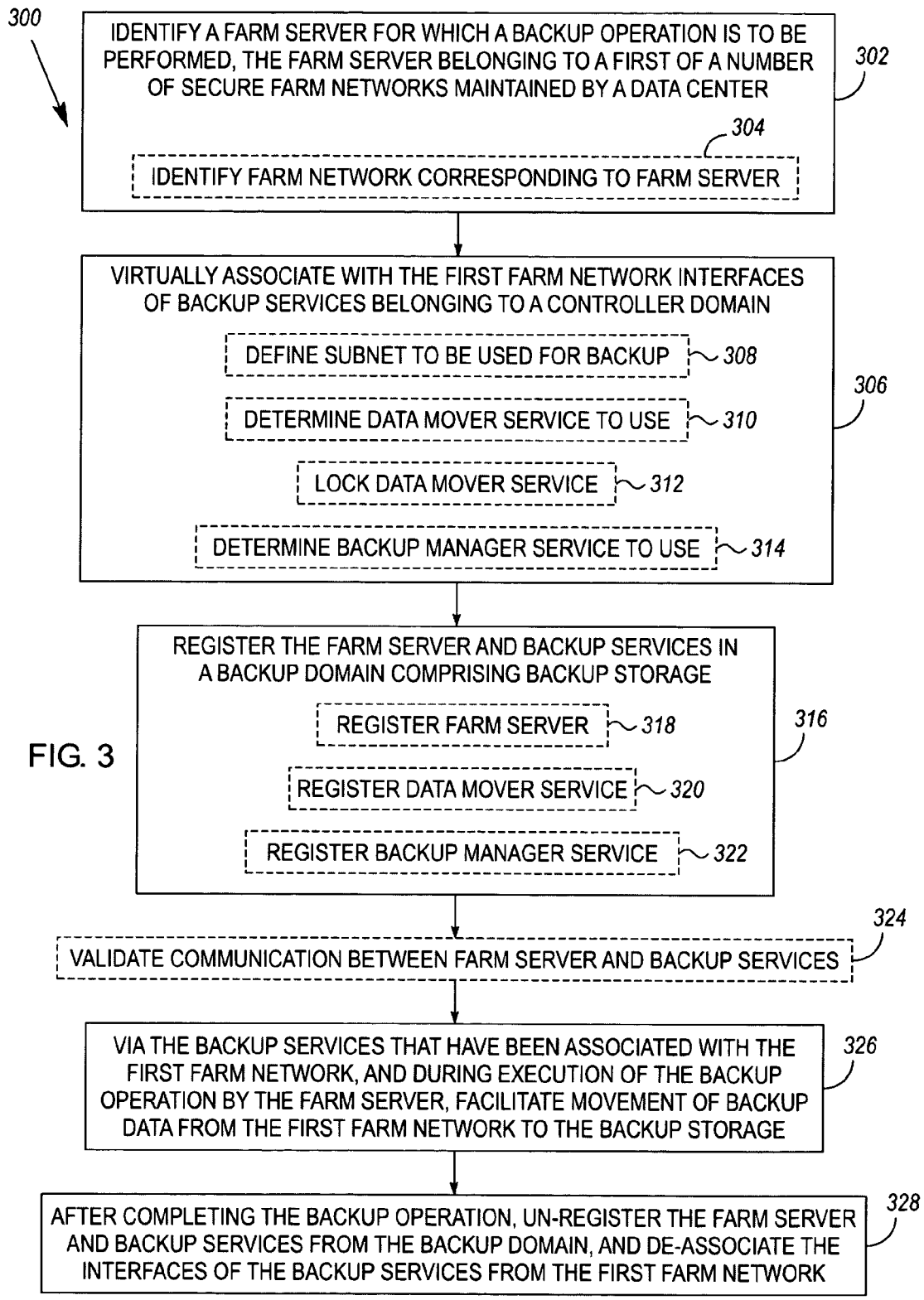
FIG. 3 illustrates an exemplary method for carrying out backup operations within a data center such as that which is shown in FIGS. 1 & 2.

Having described the various resources of an exemplary data center 100, a novel method 300 for carrying out backup operations within such a data center 100 (or within other types of data centers) will now be described. See FIG. 3. In accordance with the method 300, resources belonging to a controller domain of a data center 100 first identify 302a farm server 106b for which a backup operation is to be performed. As shown in FIG. 2, the farm server 106b may belong to the first of a number of secure farm networks 200 (e.g., FARM VLAN) maintained by the data center 100. To identify the farm server 106b, the farm network 200 in which it is located may also have to be identified 304.

After identifying a farm server 106b for which a backup operation is to be performed, the resources of the controller domain virtually associate 306 interfaces of its backup services 212, 214 with the first farm network 200 (i.e., FARM VLAN). To do this, the controller 120 may define 308 a subnet to be used for backup. The backup services may be the sole set of backup services hosted by a controller 120, or may be selected from a plurality of available backup services. Preferably, at least one pool of like (or redundant) backup services is hosted by the controller 120, and the controller 120 determines 310, 314 which of the backup services to use. In this manner, the controller 120 may select a needed backup service from alternate redundant sources, and multiple backup operations may be carried out at the same time.

The method 300 continues with the registration 316, 318, 320, 322 of the farm server 106b and backup services 212, 214 in a backup domain of the data center 100. Optionally, communication between the farm server 106b and the backup services 212, 214, as well as communication between the backup services 212, 214 and backup storage 122, may be validated 324 at this point. The farm server 106b is then allowed to execute its backup operation. During execution of the backup operation, the backup services 212, 214 that have been associated with the first farm network 106b facilitate 326 the movement of backup data from the first farm network 200 to the backup storage 122.

Figure 4:
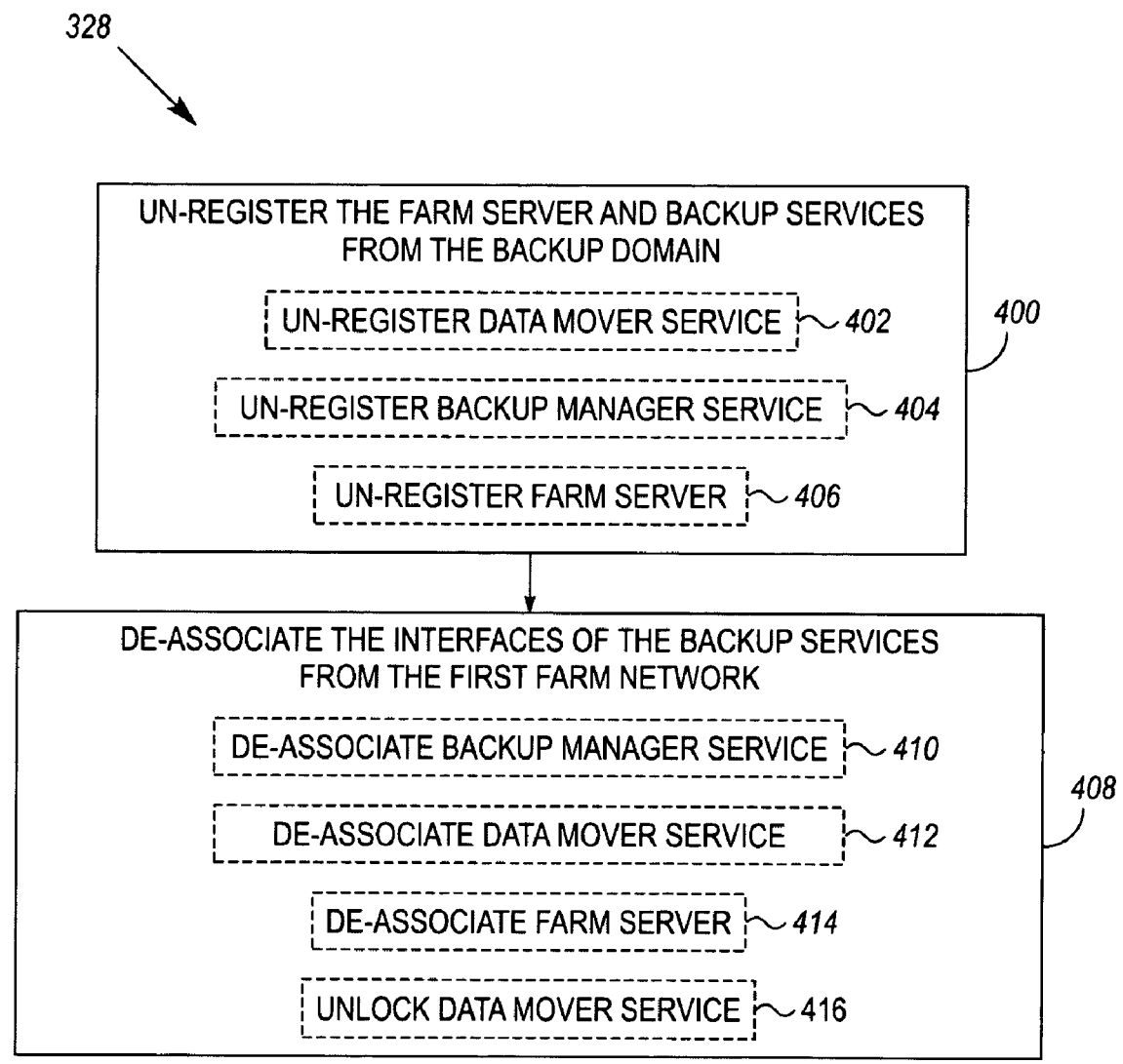
FIG. 4 illustrates an exemplary method for releasing data center resources after completing a backup operation in accordance with the FIG. 3 method.

After completing the backup operation, the farm server 106b and backup services 212, 214 are un-registered 328, 400, 402, 404, 406 (FIGS. 3 & 4) from the backup domain, and the interfaces of the backup services 212, 214 are de-associated 328, 408, 410, 412, 414 from the first farm network 200. The same backup services 212, 214 can then be used to conduct a backup operation for a farm server belonging to the same or different farm network.

By way of example, the backup services 212, 214 may comprise data mover services 212 and backup manager services 214. The backup manager services 214 may coordinate with agents hosted by the farm servers 106a-106c, as well as with the management core 212 of the controller 120. The data mover services 212 may serve to actually backup data from the farm networks 200 to the backup storage 122.

While the interfaces of the backup manager services 214 may be associated with different farm networks, so that backup manager services 214 may coordinate different simultaneous backup operations, it is preferable that interfaces of the data mover services 212 only be associated with a single farm network at a time. In this manner, there is less of a chance that the data being moved by a data mover service 212 will be intercepted by a farm network to which it does not pertain. To ensure that a data mover service 212 is associated with only one farm network at a time, the data mover service 212 may be temporarily locked 312 (FIG. 3) for sole use by a given farm network. When a backup operation has completed, the data mover service may then be unlocked 416 (FIG. 4) and used in another backup operation, initiated by the same or a different farm network.

In preparing for a backup operation, data mover and backup manager services 212, 214 may be selected from among a plurality of like data mover and backup manager services. In the data center 100, the data mover and backup manager services 212, 214 used in a particular backup operation may reside on the same or different management servers 204-210 of the controller domain.

The method 300, as well as the farm controller and backup services 202, 212, 214 mentioned herein, may be implemented via machine executable instructions (e.g., any of software, firmware, program code) that, when executed by the controller 120, cause the controller 120 to perform the actions of the method 300, or provide the functionality offered by the farm controller or backup services 202, 212, 214.

What is claimed is:

1. A method, comprising:
   under control of resources belonging to a controller domain of a data center,
   identifying a farm server for which a backup operation is to be performed, the farm server belonging to a first of a number of secure farm networks maintained by the data center;

virtually associating with the first farm network, interfaces of backup services belonging to the controller domain;
registering the farm server and backup services in a backup domain of the data center, the backup domain comprising backup storage;
via the backup services that have been associated with the first farm network, and during execution of the backup operation by the farm server, facilitating movement of backup data from the first farm network to the backup storage; and
after completing the backup operation, un-registering the farm server and backup services from the backup domain, and de-associating the interfaces of the backup services from the first farm network.

2. The method of claim 1, wherein the backup services comprise a data mover service and a backup manager service.

3. The method of claim 2, further comprising:
before associating the interface of the data mover service with the first farm network, locking the data mover service for sole use by the first farm network; and
after completing the backup operation, unlocking the data mover service.

4. The method of claim 3, further comprising, while associating the interface of the backup manager service with the first farm network, making the backup manager service available to manage backup operations performed by farm servers outside of the first farm network.

5. The method of claim 2, wherein the data mover service and backup manager service reside on different servers of the controller domain.

6. The method of claim 2, further comprising, selecting the data mover service and backup manager service from among a plurality of like data mover and backup manager services.

7. The method of claim 1, further comprising, prior to facilitating the movement of backup data, validating communication between the farm server and the backup services.

8. The method of claim 1, wherein at least a portion of said backup services reside on the same server that provides a farm controller service for managing the first farm network.

9. The method of claim 1, wherein at least a portion of said backup services reside on a server that is different from that which provides a farm controller service for managing the first farm network.

10. The method of claim 1, further comprising, selecting the backup services from at least one pool of like backup services.

11. The method of claim 1, further comprising, after completing the backup operation, using the backup services to conduct a backup operation for a farm server belonging to a second of the number of secure farm networks.

12. A data center, comprising:
a number of secure farm networks, each comprising at least one farm server;
backup storage;
a controller providing a number of backup services; and
machine executable instructions that, when executed by the controller, cause the controller to:
identify a farm server for which a backup operation is to be performed, the identified farm server belonging to a first of the farm networks;
virtually associate with the first farm network, interfaces of at least some of said backup services;
register the identified farm server and its associated backup services in a backup domain of the data center, the backup domain comprising at least a portion of said backup storage;
via the backup services that have been associated with the first farm network, and during execution of the backup operation by the identified farm server, facilitating movement of backup data from the first farm network to the backup storage; and
after completing the backup operation, un-registering the identified farm server and backup services from the backup domain, and de-associating the interfaces of the backup services from the first farm network.

13. The data center of claim 12, further comprising:
a server pool; and
a storage pool;
wherein the controller further hosts a plurality of farm controller services; and
wherein the machine executable instructions, when executed, further cause the controller to: form each of said number of secure farm networks by associating at least one of said farm controller services, at least one farm server in said server pool, and at least one storage resource in said storage pool.

14. The data center of claim 13, wherein the controller comprises a management server pool, and wherein a first management server in said management server pool hosts both a farm controller service and a backup service.

15. The data center of claim 14, wherein the farm controller service and backup server hosted by the first management server are associated with different farm networks.

16. The data center of claim 12, wherein the backup services comprise data mover services and backup manager services; wherein both a data mover service and a backup manager service are required to facilitate a backup operation; and wherein association of a particular data mover service with a particular farm network causes the machine executable instructions to temporarily lock the particular data mover service for sole use by the particular farm network.

17. The data center of claim 15, wherein the backup services comprise a plurality of like data mover services and like backup manager services; wherein both a data mover service and a backup manager service are required to facilitate a backup operation; and wherein, for each backup operation, the machine executable instructions further cause the controller to select an available data mover service and an available backup manager service from said like data mover services and like backup manager services.

18. The data center of claim 12, wherein the machine executable instructions further cause the controller to, prior to facilitating the movement of backup data from the first farm network, validating communication between the identified farm server and the backup services associated with the first farm network.

19. The data center of claim 12, wherein the backup services comprise at least one pool of like backup services; and wherein, for each backup operation, the machine executable instructions further cause the controller to select at least one available backup service from the pool of like backup services.

20. The data center of claim 12, wherein the machine executable instructions further cause the controller to associate the same backup services with different ones of said farm networks during the execution of different backup operations.

21. The data center of claim 12, wherein the secure farm networks are virtual farm networks.

22. A management server, comprising:
   a data mover service implemented in code stored on the management server;
   a backup manager service implemented in code stored on the management sever; and
   machine executable instructions that, when executed by the management server, cause the management server to i) associate an interface of the data mover service with only one of a number of secure farm networks maintained within a data center, and ii) independently associate an interface of the backup manager service with one or more of the number of farm networks.

23. The management server of claim 22, wherein the interfaces of the data mover service and backup manager service are alternately associable with the same or different farm networks during the management server's facilitation of different backup operations.

* * * * *

UNITED STATES PATENT AND TRADEMARK OFFICE
CERTIFICATE OF CORRECTION

| | |
|---|---|
| PATENT NO. | : 7,325,156 B1 |
| APPLICATION NO. | : 10/961500 |
| DATED | : January 29, 2008 |
| INVENTOR(S) | : Rheid Schloss et al. |

Page 1 of 1

It is certified that error appears in the above-identified patent and that said Letters Patent is hereby corrected as shown below:

Column 3, line 46, delete "302α farm" and insert -- 302 a farm --, therefor. (Specification filed on Oct. 07, 2004, page 10, line 2)

Signed and Sealed this

Twenty-fourth Day of June, 2008

JON W. DUDAS
*Director of the United States Patent and Trademark Office*